(12) United States Patent
Colby et al.

(10) Patent No.: US 7,063,789 B2
(45) Date of Patent: Jun. 20, 2006

(54) FILTRATION ELEMENT AND METHOD OF CONSTRUCTING A FILTRATION ASSEMBLY

(75) Inventors: David M. Colby, Medford, MA (US); Frederick K. Lesan, Encinitas, CA (US); Alan M. Franks, San Diego, CA (US); Chang-Li Hsieh, Carlisle, MA (US); Anjan Kumar Mukherjee, Tulsa, OK (US)

(73) Assignee: Koch Membrane Systems, Inc., Wilmington, MA (US)

( * ) Notice: Subject to any disclaimer, the term of this patent is extended or adjusted under 35 U.S.C. 154(b) by 0 days.

(21) Appl. No.: 10/754,908

(22) Filed: Jan. 9, 2004

(65) Prior Publication Data

US 2005/0035047 A1   Feb. 17, 2005

Related U.S. Application Data

(63) Continuation-in-part of application No. 10/640,407, filed on Aug. 13, 2003, now abandoned.

(51) Int. Cl.
*B01D 63/10* (2006.01)
*B01D 63/12* (2006.01)

(52) U.S. Cl. ............................. 210/321.85; 210/323.2; 210/493.4; 96/7; 96/9

(58) Field of Classification Search ........... 210/321.76, 210/321.85, 323.2, 493.4; 96/7, 9
See application file for complete search history.

(56) References Cited

U.S. PATENT DOCUMENTS

| 5,851,267 | A   | * | 12/1998 | Schwartz .................... 96/7 |
| 6,302,448 | B1  |   | 10/2001 | Van Der Meer et al. |
| 6,521,127 | B1  |   | 2/2003  | Chancellor |
| 6,632,356 | B1  |   | 10/2003 | Hallan et al. |
| 2002/0074277 | A1 |   | 6/2002  | Thomassen |
| 2003/0024868 | A1 | * | 2/2003  | Hallan et al. .......... 210/321.74 |

FOREIGN PATENT DOCUMENTS

WO    WO 98/46338    10/1998

* cited by examiner

*Primary Examiner*—John Kim
*Assistant Examiner*—Krishnan S. Menon
(74) *Attorney, Agent, or Firm*—Stinson Morrison Hecker LLP

(57) ABSTRACT

A coupler for a spiral membrane filtration element having a spiral membrane enclosed within a rigid outerwrap includes a center support, a plurality of spokes extending outwardly from the center support, a circular rim coupled with the spokes, with the face of the rim being perpendicular to the axis of the overwrap. The rim includes a channel on its face for receiving a compressible seal, and a plurality of receptacles around its outer surface for joining two face-to-face adjacent couplers when a pair of aligned keepers is place in each receptacle. Exemplary embodiments of the coupler and filtration elements and filtration assemblies are provided, as well as an associated method.

6 Claims, 3 Drawing Sheets

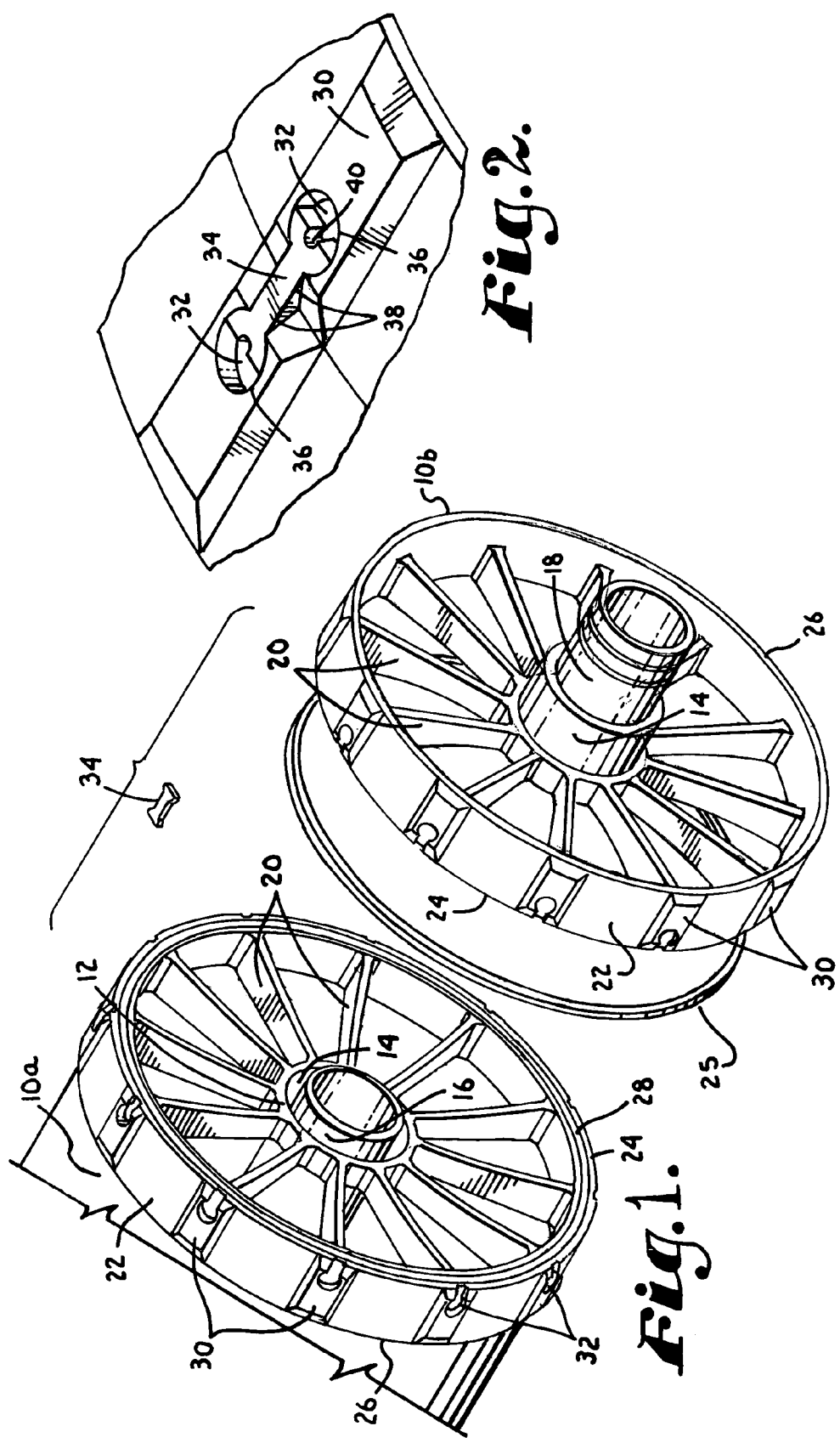

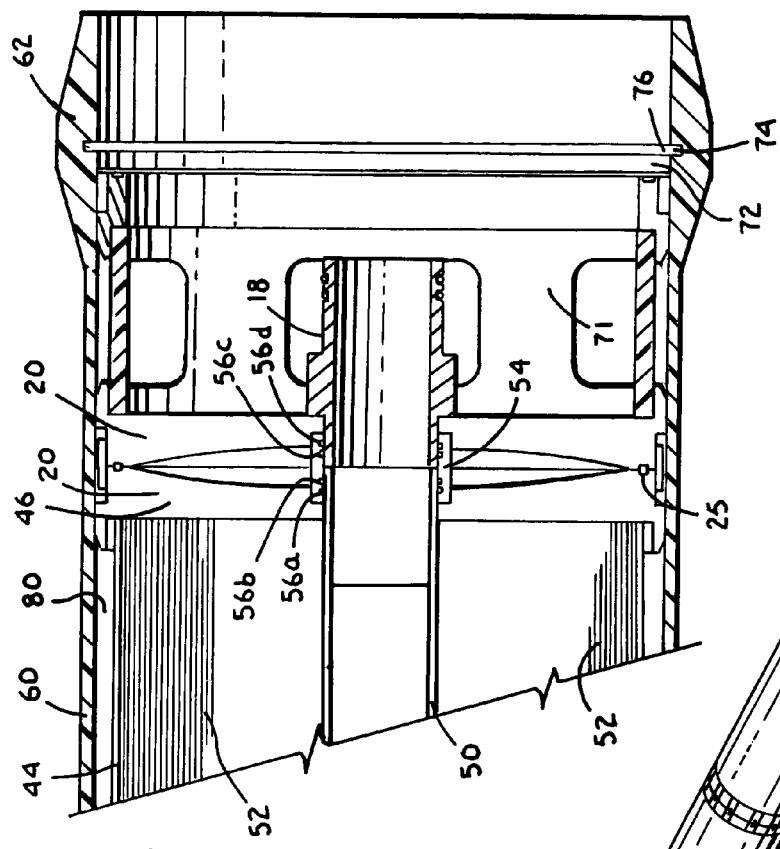

FILTRATION ELEMENT AND METHOD OF CONSTRUCTING A FILTRATION ASSEMBLY

CROSS-REFERENCE TO RELATED APPLICATIONS

Continuation-in-Part of Application Ser. No. 10/640,407, filed Aug. 13, 2003 now abandoned, is hereby incorporated by reference.

STATEMENT REGARDING FEDERALLY SPONSORED RESEARCH OR DEVELOPMENT

Not Applicable.

BACKGROUND OF THE INVENTION

1. Field of the Invention

The invention relates generally to filtration, and more particularly to a coupler for joining filtration elements.

2. Description of Related Art

Filtration membranes are used for the removal of unwanted particles or organisms from various types of fluids. Typical uses for filtration membranes include treatment and purification of drinking water, cleaning and treatment of wastewater for disposal or re-use, sludge de-watering, desalination, and clarification of juices, wines, and beverages. Filtration membranes include spiral-wound, hollow fiber, and tubular membranes. Most often, the spiral wound filtration membrane is enclosed in a hard outer wrap to form a filtration element. One or more spiral wound filtration elements are placed within a housing to form a filtration assembly. Fluid to be treated is forced under pressure into the inlet end of the filtration assembly and through the filtration membrane. Material is rejected by the filtration media while permeate passes through the media and is removed for use or further processing.

In one type of filtration assembly known in the art, two or more filtration elements, each comprising spiral-wound filtration membranes secured between two anti-telescoping end pieces, are placed end-to-end within a filtration assembly housing. The leading end, on the upstream side, of each element includes a circumferential brine seal around its outer perimeter that seals against the interior surface of the filtration cartridge housing. The brine seal also serves to position the element within the housing. Additional filtration elements may be placed end-to-end within the housing to provide a larger assembly.

However, the configuration of the known art imposes significant restrictions on filtration capability. For instance, the friction fit of the protruding brine seal on the outer perimeter of large diameter filtration elements makes it difficult to insert or pull the element into the housing, or to remove it when necessary for inspection or replacement. Since a larger diameter brine seal proportionally increases the contact area and correspondingly the friction, the larger the diameter of the element the greater the resistance to insertion of it into a housing. This drawback is compounded when attempting to insert or remove multiple filtration elements all having brine seals joined end to end into or from the housing of a filtration assembly. Increasing the force used to insert or remove the filtration elements may result in damage to the filtration elements.

Another factor in designing systems employing spiral-wound filtration membranes is the inherent tendency of the membrane to "telescope" under the system pressures present in the filtration process. When the system is designed for fluid to enter the end area of a spiral-wound membrane element, the end area is open to allow maximum fluid flow. Increasing the diameter of the filtration membrane proportionally increases the cross-sectional area of the membrane exposed to system pressure. Under pressure, the center portion of a spiral-wound membrane may be moved longitudinally, commonly referred to as "telescoping". The telescoping problem also increases with increasing diameters.

Additionally, the known art relies partially on the friction of the brine seal between the filtration element and the housing to position adjoining filtration elements within the housing, as well as to provide a seal between the elements and the housing. Thus, if a brine seal is damaged during the assembly process, not only is the sealing function compromised, the filtration element may be able to move relative to an adjoining element and the integrity of the separation process may be compromised. Large "wiper type" brine seals or large O-ring brine seals are subject to the deficiencies discussed above. Also, chevron or v-shaped brine seals when placed on multiple elements joined end to end require insertion at one end of the housing and withdrawal at the opposite end. This means substantial floor space at both ends of the housing must be left clear The prior art also contemplates the use of a circumferential band which overlaps two adjoining filtration elements to further hold the elements in place as well as to retain a seal which may be placed between the ends of two filtration elements. This construction does not lock the elements together so they can be pulled through a housing, and it does not provide a positive compression seal between adjoining elements.

Thus there exists a need in the art for a filtration element that may be easily and securely interlocked to an adjoining element, and that also allows single or multiple coupled elements to be easily inserted into, and removed from, a filtration assembly housing utilizing a single brine seal.

BRIEF SUMMARY OF THE INVENTION

The present invention is directed to an apparatus and method for easily and securely coupling filtration elements while minimizing the contact area of the brine with the filtration assembly housing. Each coupler includes a center support with anti-telescoping spokes extending from the center to a rim. Raised pads or skis are spaced around the perimeter of the outer surface of the rim, and include receptacles for receiving a keeper link. A channel is formed in each face of the rim for receiving a compressible seal. Thus, adjoining couplers can be interlocked by placing a seal in the face-to-face channels, aligning the skis and receptacles on each coupler, and placing keepers in the receptacles to interlock and join the couplers and prevent decoupling during element insertion and removal. When inserted into a filtration assembly housing, the skis minimize the contact area with the housing, thus reducing the frictional force between the coupler and the housing. The skis also allow for a single low-profile brine seal to be used for a plurality of elements resulting in less frictional resistance with the housing than is encountered when multiple brine seals are utilized. The single brine seal according to the present invention may be inserted and withdrawn from the same end of the housing. Thus, multiple filtration elements may be securely joined and easily inserted into, or removed from, a filtration assembly housing utilizing fewer seals and requiring 50% less "free" floor space.

In a first exemplary embodiment, a coupler for a spiral membrane filtration element having a spiral membrane enclosed within a rigid outerwrap includes a center support with a plurality of spokes extending outwardly to a rim. The rim may be joined to the rigid outerwrap, and has front and rear faces which are perpendicular to the axis of the outerwrap. Receptacles are spaced around the circumference of the outer surface of the rim for receiving a keeper link, and a channel around the face of the rim receives a compressible seal. Thus, adjoining couplers may be placed face-to-face and secured together by aligning the receptacles on each coupler and placing keepers in the receptacle pairs to interlock the couplers together. A seal in the channels on the faces of adjoining couplers is held between the two, forming a secure connection.

In a second exemplary embodiment, a filtration assembly includes a first spiral filtration element within a rigid outerwrap, a first coupler joined to the first filtration element, a second spiral filtration element within a rigid outerwrap, a second coupler joined to the second filtration element, a seal positioned in the channels between the first and second couplers, and a plurality of keepers placed in the aligned receptacles of the first and second couplers.

In a third exemplary embodiment, a filtration assembly includes a plurality of spiral filtration elements coupled together end-to-end, and placed in a filtration housing having a pressure plate and brine seal at the inlet end, and a thrust sleeve at the outlet end of the housing to form a complete assembly.

BRIEF DESCRIPTION OF THE DRAWINGS

FIG. 1 is an exploded perspective view of two couplers according to an embodiment of the present invention.

FIG. 2 is an enlarged, fragmentary perspective view of a portion of the two couplers of FIG. 1 interlocked together in face-to-face relationship with a keeper.

FIG. 3 is a broken, perspective view of a filtration assembly according to an embodiment of the present invention wherein multiple filtration elements are connected end-to-end.

FIG. 6 is an enlarged, cross-sectional view of the outlet end of the filtration assembly of FIG. 4, showing the positioning of the thrust sleeve of FIG. 5 within the assembly.

DETAILED DESCRIPTION OF EXEMPLARY EMBODIMENTS

Figure 7:
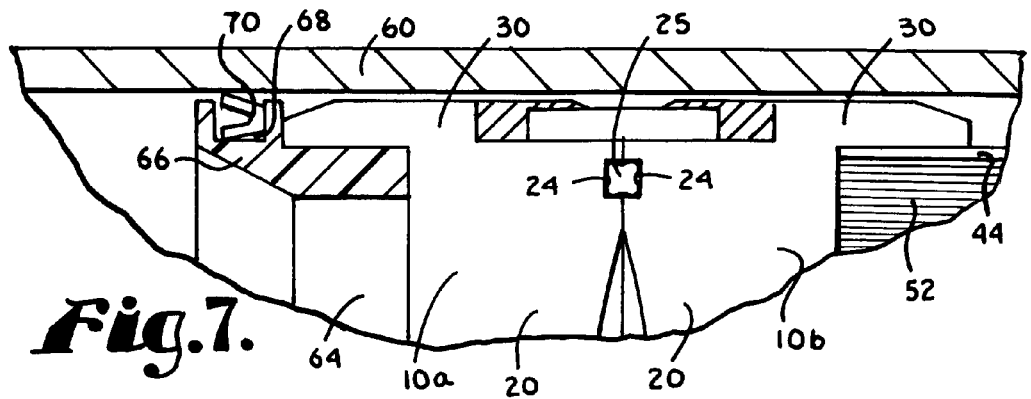
FIG. 7 is an enlarged, cross-sectional view of the inlet end of the filtration assembly of FIG. 4 showing the positioning of the pressure plate and reduced profile brine seal.

Couplers in accordance with an exemplary embodiment of the present invention are depicted in FIG. 1. Each coupler 10a, 10b includes a cylindrical center support 12 having an inner surface defining a circular opening 14. As shown, a permeate tube 16, typically combined with a permeate adapter 18 may pass through circular opening 14. Spokes 20 extend radially outward from the outer surface of center support 12 to the inner surface of a cylindrical rim 22 which encircles and joins to the outer ends of spokes 20. As can be better seen in the cross-sectional view of FIG. 6, the front edge of each spoke 20 has a slightly concave taper, with the rear edge of each spoke 20 being substantially straight. Returning to FIG. 1, rim 22 has outer and inner rim faces 24, 26. A generally U-shaped channel 28 extends around the perimeter of outer face 24 for receiving a complementary configured compressible seal 25.

Looking still to FIG. 1, raised pads or skis 30 extend around the outer surface of rim 22. Each ski 30 is shaped as a truncated tetrahedron extending upwardly from the outer surface of rim 22, with four slanted trapezoidal-shaped sides extending from rim 22 to the flat rectangular top surface of the ski 30. Receptacles 32 adjacent to outer face 26 are formed in each ski 30 to receive a keeper 34 which interlocks adjacent couplers 10. As best seen in FIG. 2, each receptacle 32 includes a circular first portion 36 and a rectangular second portion 38, together forming a keyhole-shaped recess in each ski 30. The width of circular first portion 36 at its diameter is greater than the width (taken in a direction circumferentially about the rim) of rectangular second portion 38.

As shown in FIGS. 1 and 2, dog-bone shaped keeper 34 has a narrow center portion 34a connecting larger truncated semi-circular end portions 34b, with the width of the center portion 34a sized to fit within the narrower rectangular portion of receptacle 32 and the larger truncated semi-circular end portions 34b sized to fit within the larger circular portion of receptacles 32. As also shown in FIG. 2, each semicircular end portion 34b includes a notch or cut out 40 which provides a relief area to accommodate some degree of compression of the end portions when they are force fitted into circular portions 36 of the receptacle. The relief area also accommodates some limited expansion and contraction in a longitudinal direction between elements.

As seen in FIG. 3, individual filtration elements 42 include a hard outer wrap 44 extending between, and attached to, two couplers 10a, 10b. As shown best in FIG. 6, each filtration element 42 includes a permeate tube 50 which extends between the couplers, with a spiral wound filtration membrane 52 wrapped around permeate tube 50 and filling the area between the permeate tube and the hard outer wrap. Still referring to FIG. 3, a plurality of filtration elements 42 are placed end-to-end, with adjoining elements coupled together with keepers placed in the aligned receptacles of adjoining couplers. The adjoining filtration elements 42 are thus coupled end-to-end, with the compressible seal fitting into the channels on the outer faces of adjoining couplers. When the filtration system is operational pressure on the assembly will cause seal 25 to form a fluid tight seal.

As shown in FIG. 6, permeate tube coupling 54 is a cylindrical tube with an inner diameter slightly larger than the diameter of permeate tube 50. Four grooves 56a, 56b, 56c, 56d extend circumferentially about the inner surface of coupling 54, each groove receiving an O-ring seal (not shown). Permeate tubes of adjoining filtration elements may thus be joined by placing the permeate tube coupling approximately half way over the first permeate tube so that two O-rings seal the permeate tube coupling to the permeate tube, and placing the permeate tube of a second filtration element in the remaining half of the permeate tube coupling, thus joining the two permeate tubes in fluid-tight communication. It should be understood that a permeate tube coupler would normally be present between each adjoining pair of couplers 10a and 10b although the permeate coupler has been omitted from FIG. 1 for clarity.

Figure 4:
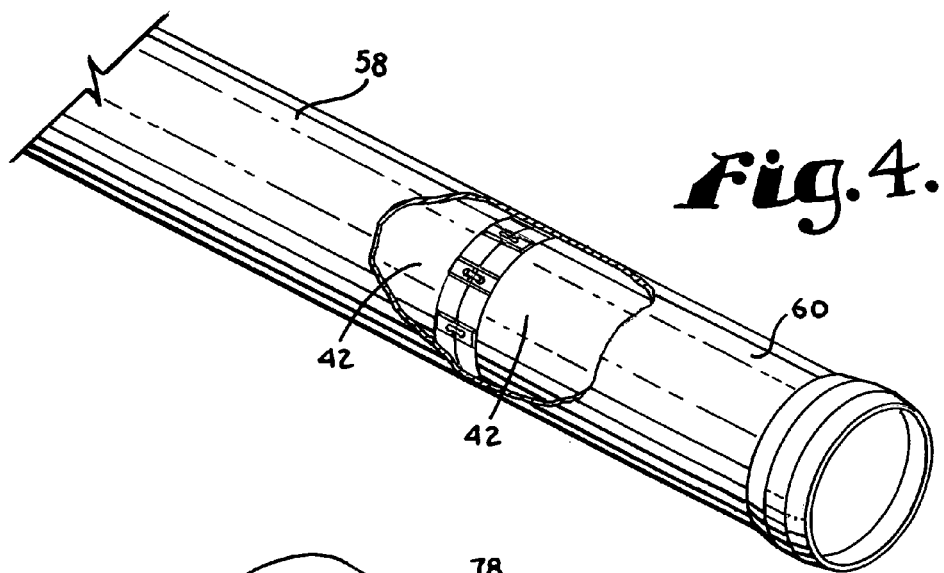
FIG. 4 is an enlarged perspective view of the filtration assembly of FIG. 3 placed within an assembly housing.

As seen in FIG. 4, a filtration assembly 58 comprises a plurality of end-to-end coupled filtration elements 42 placed within a housing 60. As best seen in FIG. 6, the end portion of the housing presents a reinforced wall 62 which is thicker than the main portion of housing 60. Looking now to FIG. 7, a seal mount 64 is rigidly secured to the rim of coupler 10a located at the inlet end of the filtration assembly. Seal mount 64 extends circumferentially around the inner surface of coupler 10a and includes an arm 66 having a channel 68 around its outer perimeter in which a low-profile, V-shaped brine seal 70 is located. Turning now to the opposite end of the filtration assembly, FIG. 6 shows a thrust sleeve 71 located at the low-pressure, outlet end of housing 60, following a plurality of end-to-end filtration elements 42. An end cap 72 is located at the outlet end of housing 60 and is held in place by a snap ring 74 in the end cap locking groove 76, which extends circumferentially around the inner surface of housing 60.

Figure 5:
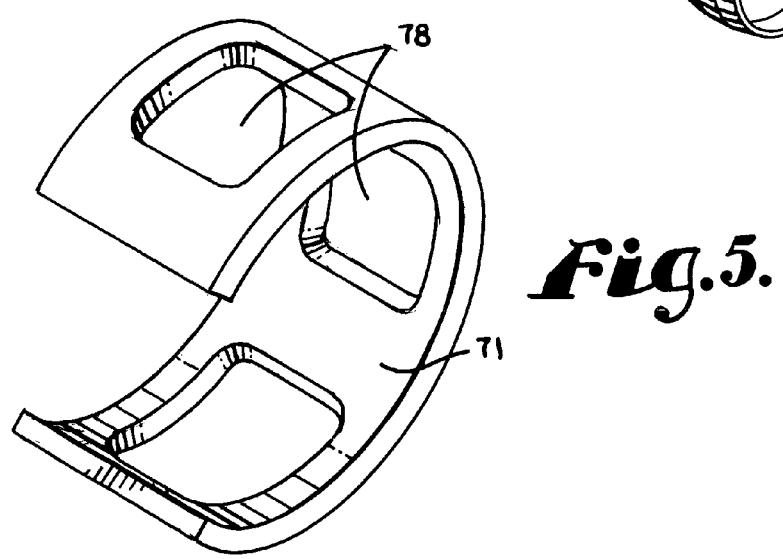
FIG. 5 is a perspective view of a thrust sleeve according to an embodiment of the present invention.

As can be best seen in FIG. 5, thrust sleeve 71 according to an embodiment of the present invention is a generally cylindrical sleeve, with a portion of the cylinder removed to form a "C" shape. The thrust sleeve 71 can thus be slightly compressed for insertion into a cylindrical filtration assembly housing. The sleeve has sufficient memory so that once inserted, it will spring back to its original shape to fit snugly within the housing. Apertures 78 formed in thrust sleeve 71 reduce the weight and material of the sleeve, and allow fluid to flow through the sleeve.

In use, adjoining couplers 10a, 10b are placed face-to-face with a compressible seal 25 positioned between, in the channels 28 on each face. As seen in FIG. 2, the skis 30 and receptacles 32 on the adjoining couplers 10a, 10b are aligned, and a keeper link 34 is placed, under slight compression, within receptacle pairs around the perimeter of the couplers. While FIG. 1 shows multiple skis 30 and receptacles 32 on each coupler 10a, 10b, any number may be employed depending upon the application. A minimum of two would suffice to hold the couplers together, more may be used in applications having higher system pressures. In one exemplary embodiment, four skis on each coupler may be used. Similarly, each receptacle need not use an associated keeper. For example, couplers having twelve skis around the perimeter may be joined using less than twelve keepers. Depending on the application, a fewer number of keepers may be used to securely join the couplers. Also, the receptacles and keepers may take different forms and shapes so long as they provide two interlocking components on adjoining couplers. The keeper and receptacle approach avoids tab-like projections which have characterized some prior art couplers and may break during use. It is highly desirable, however, for the keepers to be compressible and to have a degree of memory so they can be compression fitted into the receptacles. Also, the truncated ends 34b accommodate placement of a tool within receptacle 32 to facilitate removal of the keeper. Other variations will be apparent to those skilled in the art, and are within the scope of the present invention. Finally, the truncated ends 34b accommodate a degree of expansion and contraction of the couplers without danger of being dislodged.

As seen in FIGS. 3 and 6, individual filtration elements 42 are formed by wrapping a filtration membrane 52 around the permeate tube 50, forming a hard outerwrap 44 around the spiral wrap 52 (e.g. by coating with fiberglass reinforced epoxy) and affixing couplers 10a, 10b to each end of the outerwrap (the couplers will normally be embedded in the outerwrap). Multiple filtration elements 42 can be joined by using a permeate tube coupling 54 as seen in FIG. 6 to couple permeate tubes 50 of adjoining filtration elements 42, and using compressible seals 25 and keepers 34 to interlock the adjoining couplers 10a, 10b. It should be understood that while seal 25 is shown as a separate element in the drawings it could be integrally formed with one of the couplers and could be made from a variety of materials. The permeate tube coupling 54 uses O-rings placed in grooves 56a, 56b, 56c, 56d to join the permeate tubes 50 in fluid-tight communication, and the compressible seal 25 between couplers 10a, 10b joins the filtration elements 42. Multiple filtration elements 42 may be joined end-to-end, with space and pressure drop considerations being determinative of the exact number for a particular application.

As seen in FIG. 6, when inserted into a filtration assembly housing 60, the skis 30 of the coupler are the only portion of the filtration element that contact the inner surface of the housing 60, with a by-pass annulus area 80 formed between the filtration assembly housing 60 and the hard outer wrap 44 of the filtration element 42. Since the skis 30 are the only portion of the coupler that contact the housing 60, the frictional force between the coupler and the housing 60 is minimized. Furthermore, because skis 30 are formed from a rigid material, they assure precise centering of the element within the housing. This eliminates the need for a large brine seal on each element to correct for malalignment and insures precise positioning. In applications where fewer skis 30 are used, the frictional force is reduced even further.

As shown in FIG. 7, the brine seal 70 of the present application is a low-profile V-shaped seal. A rigid arm 66 extending from the seal mount 64 at the inlet of the filtration assembly includes a u-shaped channel 68 which extends circumferentially around the outer perimeter of the arm 66. The brine seal 70 is placed into the channel 68 so that the opening of the V-shape faces the inlet end of the filtration assembly. The smaller, low profile brine seal on only the lead element has numerous advantages including those discussed above. In addition, the low-profile brine seal 70 allows the maximum area for filtration media 52. Thus, the low-profile brine seal 70 allows more filtration media 52 (i.e. membrane) within the same housing area as compared to conventional brine seal configurations. It is to be understood that the objectives of the invention may be accomplished using other sealing element configurations such as O-rings.

At the outlet end of the filtration assembly, as seen in FIG. 6, the thrust sleeve 71 acts to absorb and withstand the longitudinal pressure being exerted by the entire assembly of end-to-end filtration elements 42. As seen in FIG. 5, apertures 78 in the thrust sleeve allow fluid to pass through the sleeve 71 in applications where concentrate is removed from the side of the filtration assembly housing 60, rather than through end cap 72.

As previously noted, one of the advantages of the invention is that the elements 42 may be inserted and removed from the same end of housing 60 as a result of using only one brine seal, and the presence of skis 30, which greatly reduce the frictional resistance between the elements and the housing. This reduces "free" space requirements in all installations.

As can be seen, the present invention is well-adapted to permit easily and securely coupling filtration elements, while minimizing the effort in inserting and removing filtration elements in a filtration assembly housing. It is particularly advantageous when applied to large diameter filtration elements but is applicable to all size elements.

Of course, other deviations from the embodiments described in the present application are anticipated by, and within the scope of, the present invention. For example, while the filtration media described in the exemplary embodiment is a spiral-wound element, other forms of filtration membranes may be employed. The end cap shown in FIG. 6 may be made of aluminum, or any other strong, lightweight material. Thus, various materials and configurations of the described components may be employed without deviating from the scope of the present invention From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims.

The invention claimed is:

1. A filtration assembly comprising:
   a first spiral element comprising a spiral wound membrane enclosed within an elongated rigid outerwrap
   a coupler joined with said first element and comprising a center support, a plurality of spokes extending outwardly from said center support, and a rim coupled with said spokes at one end, said rim forming a circle having a radius corresponding to the radius of said outerwrap and said rim having a face which lies in a plane perpendicular to the axis of said rigid outerwrap, said face comprising a channel, said rim presenting a planar surface comprising a plurality of circumferentially spaced receptacles along said surface;
   a second spiral element comprising a spiral wound membrane enclosed within a rigid outerwrap;
   another one of said couplers joined with said second element;
   a compressible seal positioned in the opening presented by said channels when said couplers are placed in face to face relationship;
   a plurality of keepers positioned within the openings presented by said receptacles when said couplers are placed in aligned face to face relationship whereby said elements are joined so that a force applied to one element will also be applied to the other element.

2. An assembly as set forth in claim 1, wherein said elements are adapted to be placed in a housing, said coupler including a plurality of skis extending from said outer surface to present a plurality of contact surfaces for engaging said casing.

3. An assembly as set forth in claim 1, wherein each of said first and second elements includes a permeate tube extending through the center of said spiral membrane and wherein said center support comprises a hub adapted to be received on said permeate tube.

4. An assembly as set forth in claim 1, wherein is included a casing having an inner surface and an outer surface for receiving said elements and having an inflow end and an outflow end; said assembly further including:
   an arm rigid with and extending in the direction of said inflow end coupler which is closest to said inflow end, said arm presenting a circumferentially extending channel which presents an opening facing said casing inner surface;
   a seal characterized by a circumferentially extending flexible component which extends above the edge of said circumferentially extending channel and toward said inner surface,
   whereby fluid entering said inlet end exerts a force against said flexible component to form a fluid tight seal with said casing.

5. An assembly as set forth in claim 4, wherein is included a thrust ring at the end of said element which is closest to said outflow end and locking structure rigid with said casing which precludes axial movement of said elements in the direction of said outlet end.

6. An assembly as set forth in claim 4, wherein said seal is generally u-shaped with one leg extending at an acute angle in the direction of said inflow end.

* * * * *